United States Patent [19]

Someus

[11] Patent Number: 5,261,936
[45] Date of Patent: Nov. 16, 1993

[54] GAS TREATING APPARATUS

[75] Inventor: Edward Someus, Guernsey, Channel Islands

[73] Assignee: Productcontrol Limited, Channel Islands

[21] Appl. No.: 842,123
[22] PCT Filed: Sep. 24, 1990
[86] PCT No.: PCT/SE90/00607
§ 371 Date: Mar. 24, 1992
§ 102(e) Date: Mar. 24, 1992
[87] PCT Pub. No.: WO91/05030
PCT Pub. Date: Apr. 18, 1991

[30] Foreign Application Priority Data

Sep. 29, 1989 [CA] Canada .................. 614911

[51] Int. Cl.$^5$ .............................. B01F 3/04
[52] U.S. Cl. .......................... 55/222; 55/241; 55/223; 261/153; 261/149
[58] Field of Search ............ 55/222, 240, 241, 223; 261/153, 149

[56] References Cited

U.S. PATENT DOCUMENTS

| | | | |
|---|---|---|---|
| 2,069,389 | 2/1937 | Peebles | 55/241 |
| 2,139,827 | 12/1938 | Johnstone et al. | 55/222 |
| 4,129,420 | 12/1978 | Koppelman | 44/51 |
| 4,305,909 | 12/1981 | Willett et al. | 55/222 |
| 4,318,713 | 3/1982 | Lee et al. | 48/203 |
| 4,477,257 | 10/1984 | Koppelman | 44/30 |

FOREIGN PATENT DOCUMENTS

| | | |
|---|---|---|
| 0167702 | 1/1986 | European Pat. Off. |
| 1921884 | 3/1970 | Fed. Rep. of Germany |
| 2124010 | 12/1971 | Fed. Rep. of Germany |
| 2831638 | 4/1979 | Fed. Rep. of Germany |
| 3147391 | 6/1983 | Fed. Rep. of Germany |
| 89/09809 | 10/1989 | PCT Int'l Appl. |
| 1458238 | 12/1976 | United Kingdom |
| 2065500 | 7/1981 | United Kingdom .......... 55/241 |

*Primary Examiner*—Tim Miles
*Attorney, Agent, or Firm*—Ladas & Parry

[57] ABSTRACT

This invention provides an apparatus for treatment or refinement of organic or inorganic material. The apparatus comprises a gas washing unit, a first chamber formed at the bottom of the gas washing unit, a second chamber formed at the top of the gas washing unit, and a plurality of vertical pipes provided to communicate the first and the second chambers. A first group of nozzles is provided near the top of the first chamber, so as to define a first washing step for gas entering the first chamber. Then the gas enters the lower ends of the pipes towards their upper ends. The second group of nozzles are provided over the upper ends of the pipes so that the sprayed washing water falls down through the pipes and collects the impurities contained in the gas to form a second washing step.

4 Claims, 8 Drawing Sheets

GAS TREATING APPARATUS

This application is related to U.S. Ser. No. 07/576,486 filed Oct. 3, 1990.

FIELD OF THE INVENTION

The present invention relates to a method and an apparatus for refinement or treatment of material. More specifically, the present invention relates to converting processing, destruction, separation, disinfection, and neutralization of organic and inorganic materials, with or without organic and inorganic additions. The base material utilized is waste from other production, e.g. from the forest industry or slaughter-house waste, or material to be neutralized because of toxic or infective properties. The invention provides for refinement of the organic base material into directly useful or packeted end product where the base material is produced. The invention comprises carbonization of the base material into carbon powder, and subsequent treatment of the carbon powder into various forms. The invention specifically produces carbon powder/granulate as fuel, charcoal for grilling/smoking, active coal, additives for steel production etc and other substances derived in the separation process.

The invention also provides for treatment of inorganic material with the purpose of decomposing the material in order to neutralize poisonous or infective material and to recover the separated substances.

STATE OF THE ART

Various carbonization and charcoal burning methods have been known for a long time. The problem is to find a method which can be carried out to a lower cost, since the base material often has a very short range of action, i.e., it is not worthwhile to transport the base material a longer distance than e.g. 50 km. On the other hand, coal from coal mines is contaminated by sulphides and thus requires expensive purification by filters etc.

The present invention provides a dynamic system which can be transported to the origin of the base material and which at low cost refines or processes the material. Thus, organic materials, such as agricultural, forest and slaughterhouse waste, can be used, which materials are not contaminated by undesired substances. Also, inorganic materials can be processed by the system of the invention, with the purpose of neutralization, disinfection etc.

SUMMARY OF THE INVENTION

Accordingly, the present invention provides a method of processing of material characterized by the steps of:

feeding finely divided base material of into a closed reactor;

decomposing the base material into a solid phase and reaction fluids by heat treatment in said reactor;

cooling the separated solid phase; and if necessary, forming the solid phase to the desired particle size.

Advantageously the cooling step further includes additional treatment of solid material, such as mixing with organic and/or inorganic materials in order to produce various end products. The invention is especially intended for producing charcoal for grilling/smoking, active coal and carbon powder/granulate as fuel.

The invention also provides an apparatus for carrying out the method of the invention.

BRIEF DESCRIPTION OF THE DRAWINGS

The present invention will now be described by way of example and with reference to the appended drawings, in which.

DETAILED DESCRIPTION OF PREFERRED EMBODIMENTS OF THE INVENTION

The term refinement, as used herein, refers to conversion and processing of the chemical, biological and physical structure of organic materials (the biomass, carbon compounds), with or without organic or inorganic additions. The term treatment is intended to comprise e.g. destruction, separation, disinfection and neutralization of inorganic and organic material. The intention is to use excess and waste biomaterial and to obtain new end products by multiplicative process effect. Suitable base materials are most organic materials but the most optimal are: air-moist wood, forest fuel or energy wood, chips, peat, oilshale, dried animal debris, straw etc. The invention can also be used to obtain an end product in which undersirable properties of the base material have been eliminated. In this case the base material includes poisonous and/or infective material, e.g. from hospitals or chemical industries. By supplying heat energy at a low pressure, which promotes the decomposition of the material, the conversion process is effected, with or without additions, whereupon, in dependence of the structure of the base material, such as energy content, microstructure, elemental analysis, microsystems, main and by-products are formed in different stages. The most important main products are concentrated carbon compounds and condensed distillates in the form of tar, turpentine oil, methanol, acetic acid etc. If a by-product is uncondensable gas, it can be used to partly fuel the system as process energy. The main products are treated further to end products. Organic and inorganic materials can also be treated in the same apparatus without causing chemical conversion of the structure, with or without additions or heat in the right combination, such as disinfection, product forming, etc In FIG. 1 a specific embodiment of the present invention is shown by way of example. In this example the base material is organic. The base material is ground, chopped, sawed or otherwise divided into pieces of an appropriate particle size. It is important that the pieces are not too big, since this disadvantageously effects the heat absorption of the material. The finely divided base material is fed by a feeding unit 1, e.g. a conveyor belt or a screw feeder, from a pre-drying unit (not shown) to the prestorage unit 2 for continuous feeding. In the pre-drying unit the water contained in the base material is evaporated so that the base material obtains a water content of about 5 to 10 percent, the dryer the better. The base material is also pre-heated to 130°-170° C. If the base material permits, the system can be used without the pre-drying unit.

The material is then fed to the reactor 7 by the reactor feeding unit 6, a screw feeder. The material is degassed by compressing the material in order to avoid oxidation. The reactor 7 is described in further detail below. The reactor is heated to a temperature of 800°-900° C. The temperature is achieved mainly by heat from a burner 21, possibly together with heat set free from exothermic reactions. The burner 21 is fuelled by oil and combustible gases recovered from the process, if available. The pressure in the reactor can be varied from about 5/100 atm to 3 atm. A low pressure promotes the decomposition of the material. The base material is decomposed into carbon powder, the primary end product, and various fluids. The carbon powder has a particle size of about 1 μm. The carbon powder is the product of primary interest but the by-product fluids are utilized as well. Two valves 23 are operated to evacuate the gaseous phase through a conduit 24 to a gas fractionator assembly or distillation unit which will be described in further detail below. The conduit 24 has two connections to the reactor 7, one at each side of the reactor. By closing one of the valves 23 the associated portion of the conduit 24 can be cooled to prevent it from overheating. Combustible gases are transported from the distillation unit to a vessel 22 for temporary storage. From the vessel 22 the gases are fed to a burner 21 that heats the reactor 7 which is arranged in an isolating chamber 9 to be described in further detail below. Thus, the non-condensable gases are reintroduced into the system for energy recovery.

Thereafter the carbon powder is brought to a cooling unit 10 in which the carbon powder is cooled and possibly treated by addition of organic or inorganic material, in dependence of the intended secondary end products. The temperature is decreased from 900° to about 60° C. From the cooling unit 10 the secondary product is transported by a cyclone 11, 12 to a buffer storage 13 in which the product is cooled further, if necessary. Two embodiments of the cooling unit are described in further details below.

Thereafter the secondary product is formed in a forming or granulation unit 15 in which the product is granulated to a desired particle size. The product is now ready for immediate use, bulk transport or packeting in a packeting unit (not shown).

Figure 1:
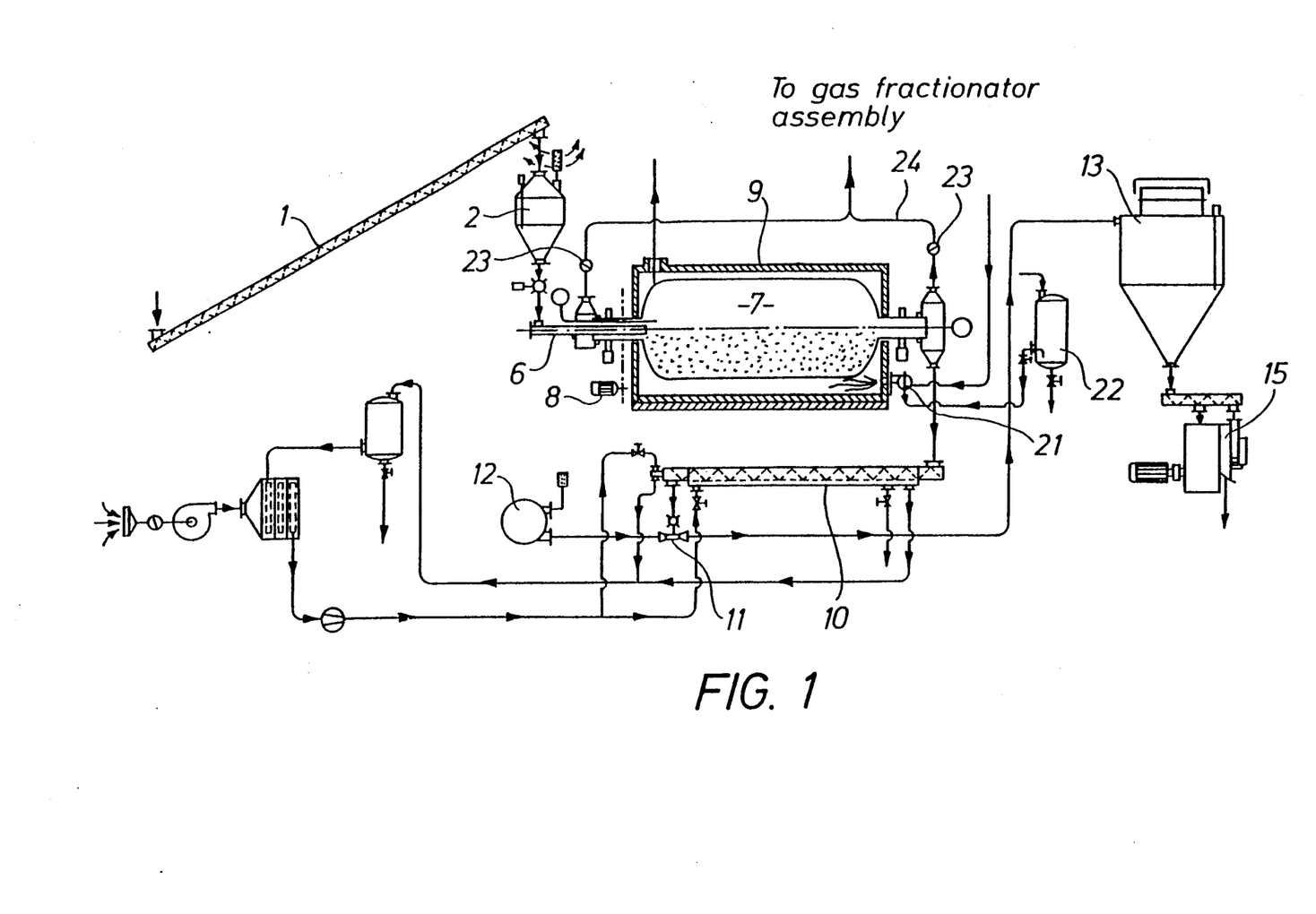
FIG. 1 is a schematic view of an embodiment of the invention.
Figure 2:
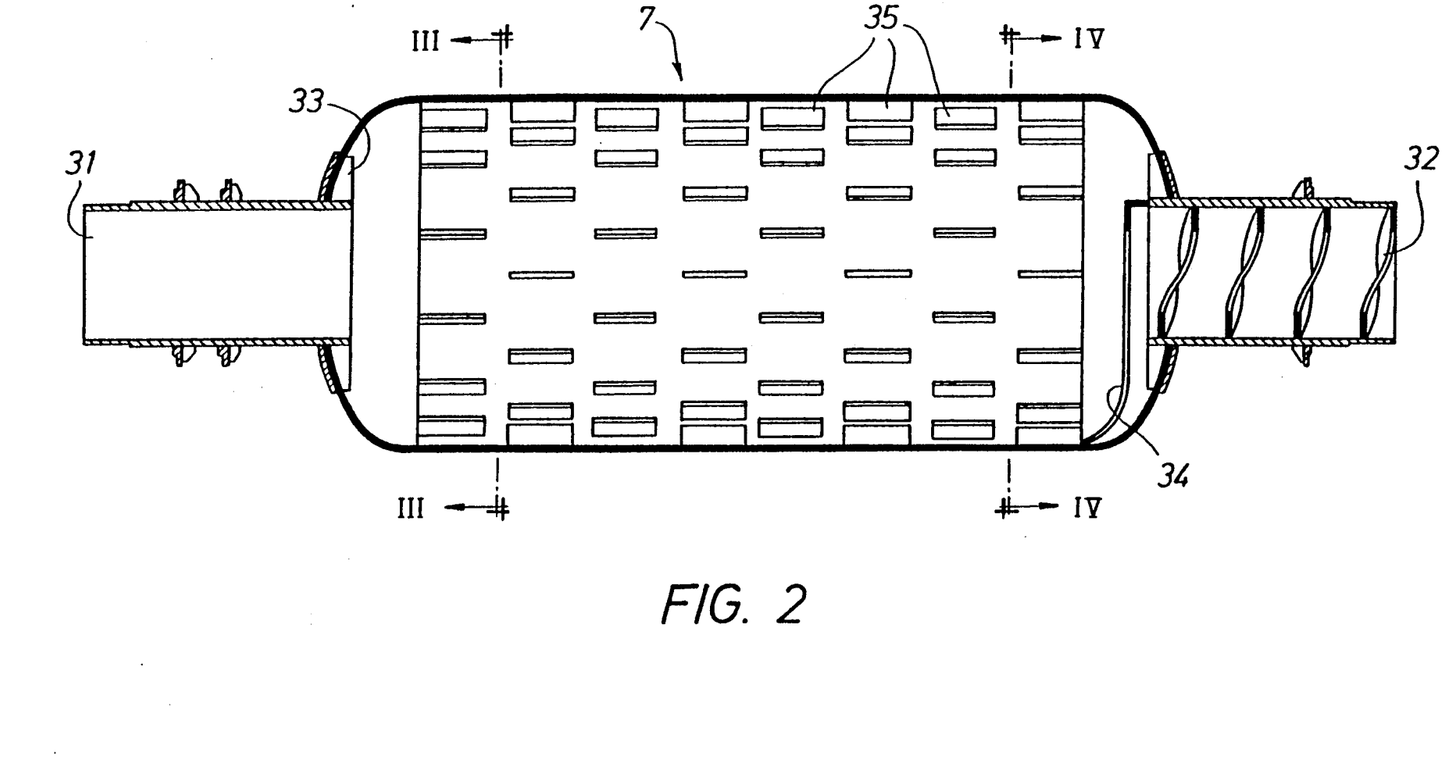
FIGS. 2, 3 and 4 are different views of the reactor of the invention.
Figure 3:
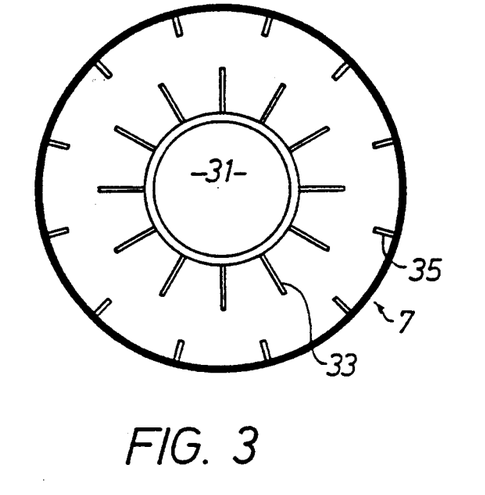
Figure 4:
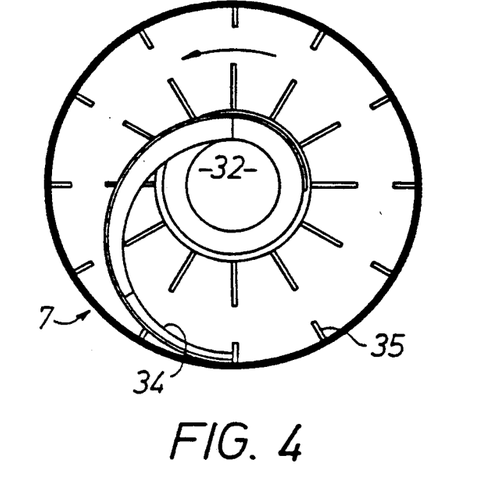

In FIGS. 2 to 4 various views of the reactor 7 are shown. The reactor is made of an acid-resistant material in order to be able to resist the reactive products of the carbonization. The reactor has an inlet 31 through which the base material is continously fed. The carbonized material is output through an outlet 32. The reactor is rotated by a motor 8 (shown in FIG. 1). The motor speed can be varied in at least three steps in dependence of the base material and the various process parameters. A plurality of fins 33 arranged around the inlet 31 and fins 35 arranged radially on the interior surface of the reactor serve to distribute the material as the reactor is rotating. A coil arrangement collects the carbon powder produced by the process and feeds the material out of the reactor 7 through the outlet 32.

Figure 5:
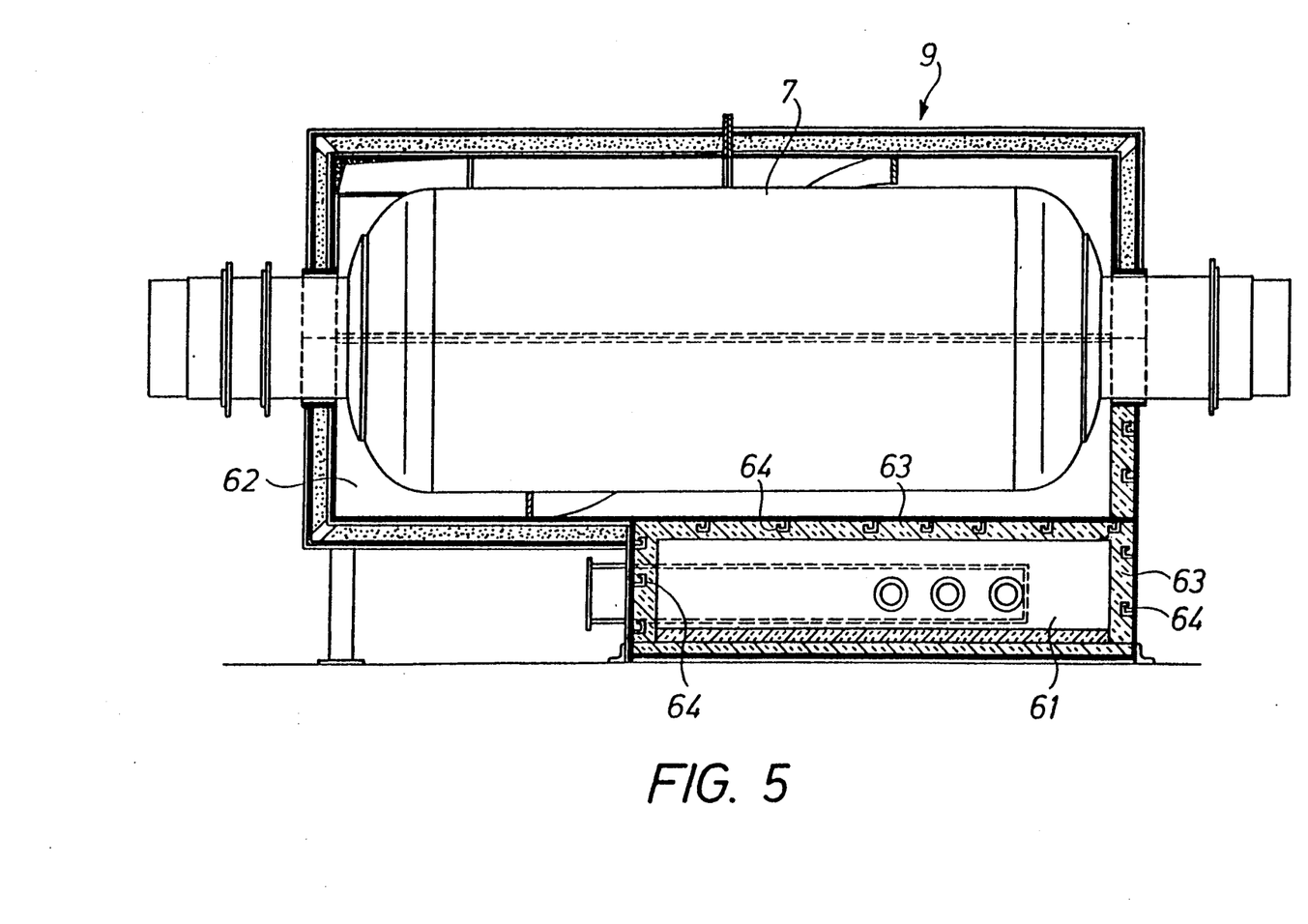
FIG. 5 is a cross-sectional view of a heating chamber.

In FIG. 5 the heating chamber 9 is shown in a cross-sectional view. The chamber actually consists of two chambers, a small combustion chamber 61 and a larger chamber 62 housing the reactor 7. The combustion chamber 61 has walls provided with slabs 63 of ceramic material for heat isolation. The ceramic slabs are quite heavy and they are attached by means of hooks 64 which prevent the slabs from coming loose due to vibrations when the apparatus is transported. The reactor chamber 62 is isolated by walls of fibreglass in order to keep down the weight of the chamber. The top portion of the chamber 62 is hinged as a lid, so that it can be swinged aside for removal or repairing of the reactor 7.

Figures 6A, 6B, 6C:
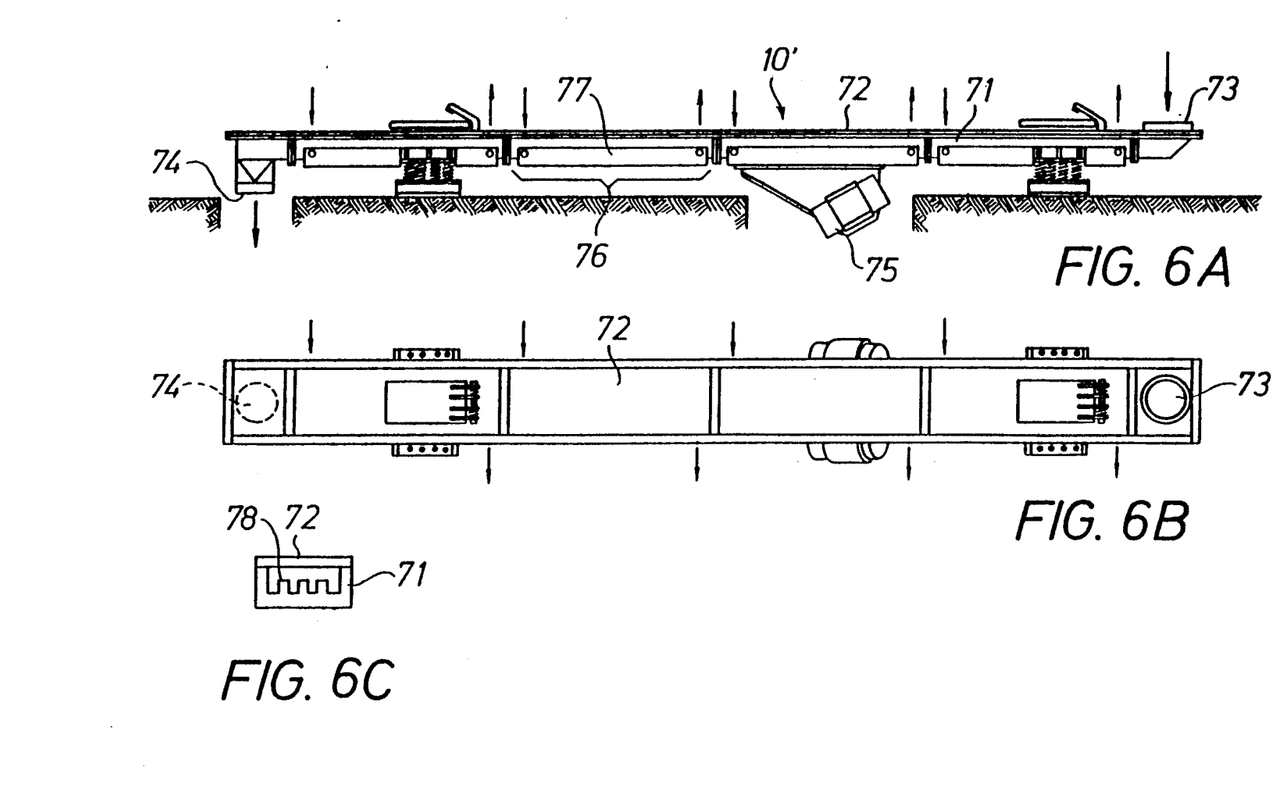
FIGS. 6A and 6B are elevation and plan views, respectively, of a first embodiment of a cooling unit according to the invention.
FIG. 6C is a sectional view of the cooling unit of FIGS. 6A and 6B.

In FIGS. 6A, 6B and 6C a first embodiment of the cooling unit 10' according to the invention is shown. As is best seen in FIG. 7C, the cooling unit comprises a trough-like portion 71 having an enclosing top portion or cover 72. The material to be cooled is fed into the inlet 73 and conveyed through the unit to the outlet 74 at the other end. The material is moved by vibrating the whole unit by means of a vibrating motor 75 attached to one of the longitudinal sections 76. Each longitudinal section 76 has a cooling circuit 77 for circulating cooling fluid, e.g. water or oil. The number of sections 76 is chosen in dependence of the required dwelling time of the material. Also the frequency and direction of the strokes of the motor can be varied.

The cooling fluid is circulated in the trough portion 71 and also in upright flanges 78 provided on the bottom of the trough. Thus, the material has a large contact surface with the cooling portions.

The cooling unit 10' is also utilized to add organic and/or inorganic material to the carbon powder and/or to activate the carbon powder. A plurality of nozzles (not shown) are provided through the cover 72. Gases, such as $CO_2$ and $H_2O$, and/or other additives are injected into the carbon powder which stirs up the powder and thus assists to bring the powder in contact with the cooling portions. In addition, the injection itself has a cooling effect and the $CO_2$ also prevents auto-ignition of the carbon powder.

Figures 7A, 7B:
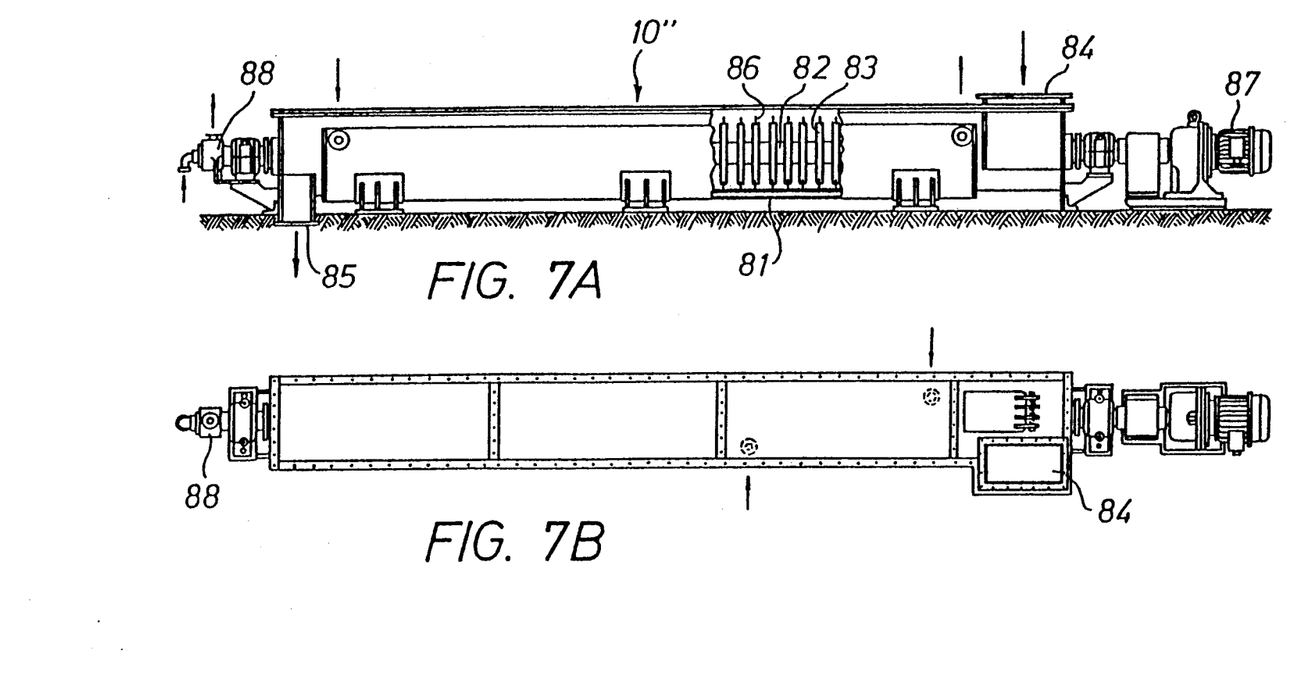
FIGS. 7A and 7B are elevation and plan views, respectively, of a second embodiment of a cooling unit according to the invention.
Figure 7C:
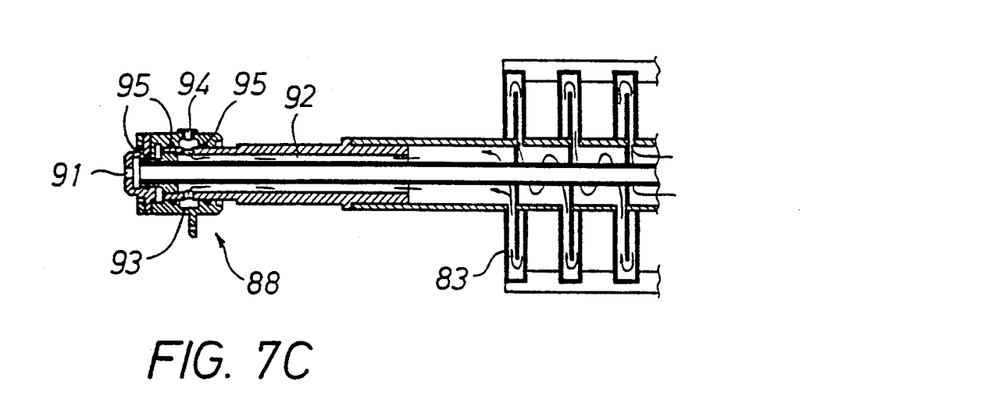
FIGS. 7C and 7D are detailed cross-sectional views of rotary flow joints of the cooling unit of FIGS. 7A and 7B.

In FIGS. 7A and 7B a second embodiment of the cooling unit 10'' is shown in two views. It comprises a double-walled tube 81 which houses a double-walled shaft 82 provided with flanges 83. The carbon powder to be cooled is introduced into the inlet 84 and moved through the unit to the outlet 85 at the other end thereof. At the edge of each flange 83 vanes 86 which are shaped like on a propeller are provided. When the shaft 82 is rotated by a motor 87 the carbon powder is moved successively from one flange 83 to the next through the whole unit.

The cooling fluid, e.g. water or oil, circulates between the double walls of the tube 81 as well as in the shaft 82 and the flanges 83. This arrangement provides a large contact surface between the cooling unit and the carbon powder.

The cooling fluid is introduced into the shaft 82 through a rotary flow control joint 88 provided at one end of the unit. The rotary joint 88 is shown in detail in FIG. 7C. The joint comprises a double-walled tube having an inner tube 91 and an outer tube 92. The cooling fluid enters the shaft 82 through the inner tube 91 by the recirculator joint 89 shown in FIG. 7D. The cooling fluid finally exits through an annulus 93 provided in a stationary portion of the joint 88. Gaskets 95 are provided to make the joint 88 perfectly tight.

Figure 7D:
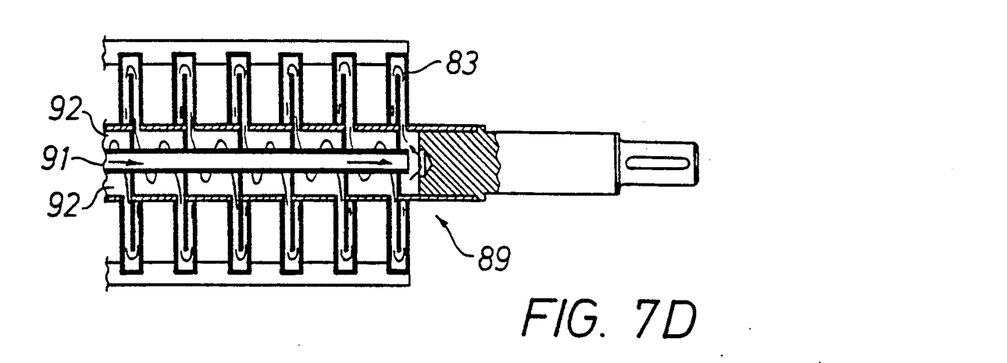

The recirculator joint 89 is shown in FIG. 7D. As is shown, the cooling fluid flows in the inner tube 91 and is directed to the outer tube 92. On its way back to the rotary flow control joint 88 and finally to the outlet 94, the cooling fluid passes, in turn, each flange 83 in a helical manner, as shown by the arrows.

The cooling unit 10" is also provided with nozzles at the arrows of FIG. 7B (not shown) for injecting organic and/or inorganic material into the carbon powder. The injection is effected in a similar way to the first embodiment of the cooling unit.

Figure 8:
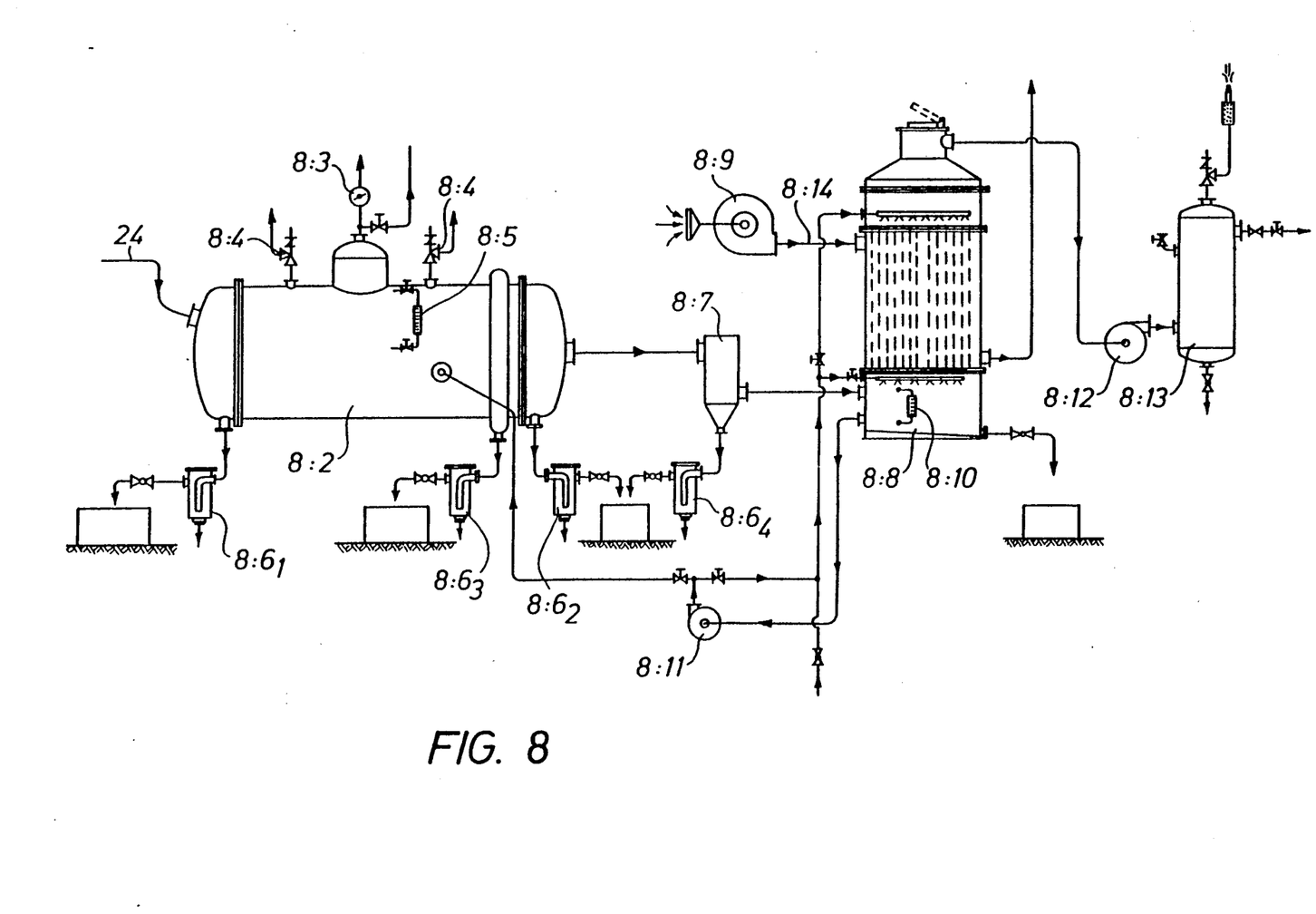
FIG. 8 is a schematic view of the gas fractionator assembly according to the invention.

In FIG. 8 a schematic view is shown of the distillation unit connected to the reactor 7 via the conduit 24 seen in FIG. 1. The hot gases enter a heat exchanger 8:2 for a gradual cooling and separation of various distillates. The uncondensed gases flows out of the heat exchanger and are led to a vessel 8:7 where the gases are cooled further and the last distillate is recovered. From the vessel 8:7 the uncondensable gases are directed to a gas cooling and washing unit 8:8 wherein the gas is cooled and washed. The pure gas is then fed into a pressure vessel 8:18 by a compressor 8:12 for storing or immediate feeding to a burner. The pressure vessel may be identical with vessel 22 of FIG. 1.

The heat exchanger 8:2 which is also shown in cross section in FIG. 9B will now be described further. The cooling medium which can be water from the gas cooling unit 8:8 is circulated around the tubes shown in FIG. 9. Steam is vented through a valve 8:3. Thus, the impurities in the water collected in the washing stage in the gas cooling unit 8:8 can be drained from the system through the drainagae valve 8:$6_3$ while only pure water is steamed away. A first distillate in a first chamber and discharged is recovered at 8:$6_1$. In the case of organic base material the first distillate is heavy tar or so-called first tar. The distillate is drained through a drainage means which includes a drain trap shown separately in FIG. 10. At 8:$6_2$ the second distillate is discharged from a second chamber, in the organic case, light tar or secondary tar. A couple of safety relief valves are provided at 8:4.

Figures 9, 10, 11:
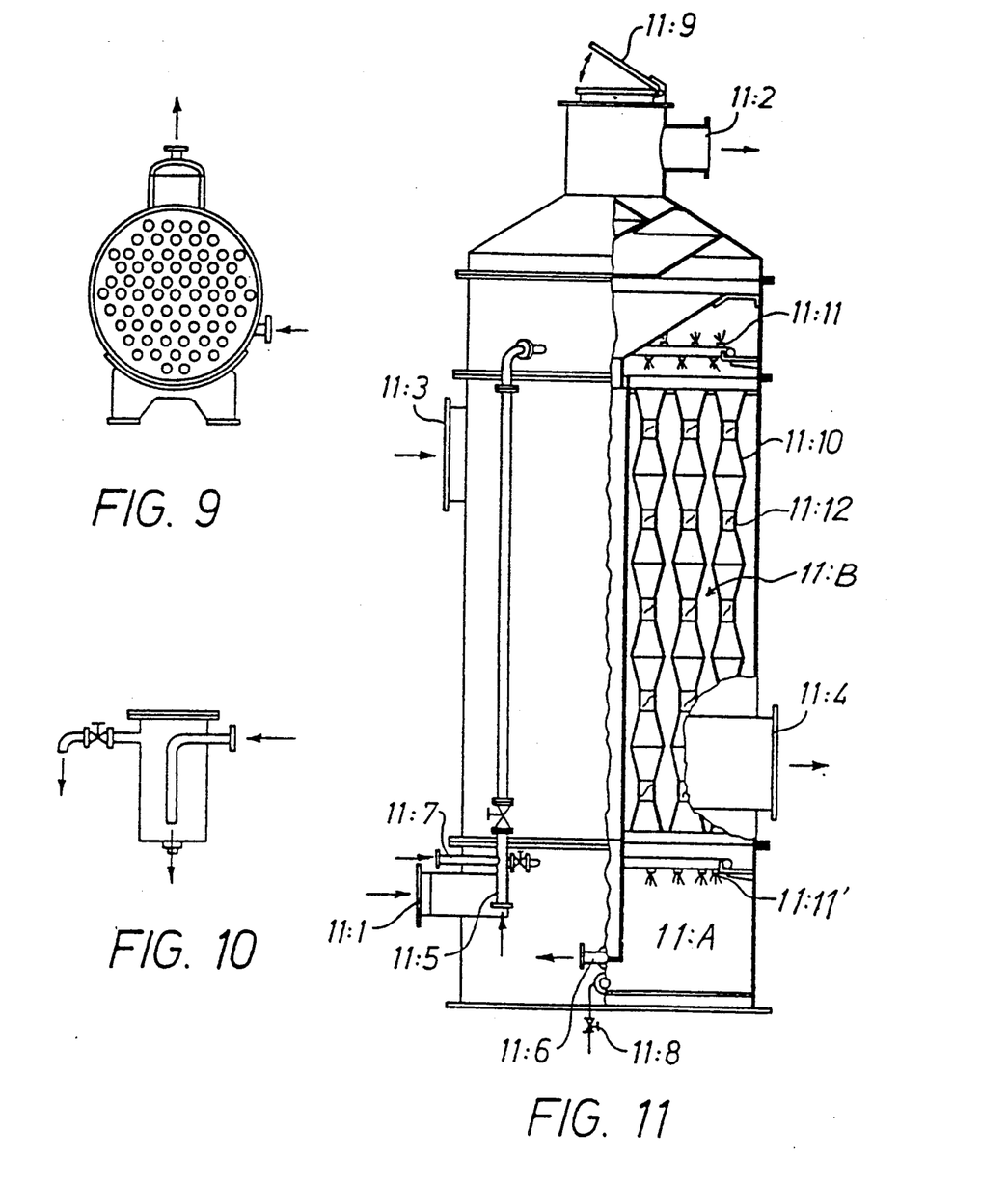
FIG. 9 is a cross-sectional view of the heat exchanger of the distillation unit.
FIG. 10 is a schematic view Of an outlet means according to the invention.
FIG. 11 is a cut-away view of a gas washing unit according to the invention.

The gas washing unit 8:8 is described further in detail with reference to FIG. 11. The still warm uncondensable gas flows from the vessel 8:7 (shown in FIG. 8) and enters the gas washing unit at the inlet 11.1 into a first chamber 11:A at the bottom of the unit and finally exits through the outlet 11:2 at the top of the unit. The gas to be washed and cooled is washed in the first chamber 11:A as a first washing step by water sprayed from nozzles 11:11 at the top of the first chamber 11:A. The gas is cooled by air which is blown into the unit by a fan or compressor 8:9 shown in FIG. 8. The air enters at 11:3 and exits at 11:4. A second washing step is provided in a second chamber 11:B at the top of the washing unit, in which vertical pipes 11:10 are arranged. The gas to be washed and cooled flows upwards through pipes 11:10 having a varying cross-sectional area while the cooling air flows downwards around the pipes. The gas is washed with water that circulates in a closed system. The water is sprayed through nozzles 11:11 at the top of the unit and falls down through the pipes 11:10 in order to contact the gas and collect impurities which are solved or captured in the water.

The varying cross section of the pipes 11:10 brings about a varying gas pressure which favours the absorption of the impurities. The water is also deflected by plates 11:12 arranged in the pipes at the narrowest passages. The plates impart a spiralling motion to the gas which favors the exchange of impurities from the gas to the washing water and increase the contact surface. The water thereafter exits at the outlet 11:6. A pump 8:11 shown in FIG. 8 either recirculates the water via the right branch into the gas washing unit at inlet 11:7 or pumps the water via the left branch to the heat exchanger 8:2. When the water is not recirculated fresh water is supplied through another inlet 11:5. The gas washing unit is also provided with a drainage valve 11:8 and a safety relief lid 11:9.

The primary function of the gas washing and cooling unit is to wash combustible gases. If the non-condensable gases are not to be burnt the gas cooling unit may be omitted.

The apparatus according to the invention is suitable for producing various products which are obtained by varying the process parameters, especially the temperature and the pressure in the reactor 7 and by varying the organic and/or inorganic additives. The first product is charcoal for grilling and/or smoking. In this case the carbon powder in the cooling unit is mixed with sawdust from different kinds of wood, spices, water and/or fat. The charcoal so produced generates different kinds of smoke when burning and thus, conveys different seasoning of the grilled or smoked foodstuff. The particle size is about 10 mm diameter.

The second product is active coal in which case carbondioxide, water steam and/or some other activating agent are injected into the carbon powder during the cooling in the cooling unit in order to open the pores of the carbon particles.

The third product is pure carbon powder which is required e.g. in the steel industry and pharmaceutical industry.

A fourth product is graphite. Graphite production requires high temperature and pressure which accordingly require a high strength reactor. This May be prohibitive for the mobility of the system.

The apparatus according to the invention can also be utilized to advantage in general heat treatment and decomposition of any material, whether organic or inorganic. In the case of inorganic base material the process according to the invention is somewhat altered. No combustible gases are produced, and therefore, energy has to be supplied externally. Also, the gas cooling unit 8:8 is omitted.

One example of an inorganic base material is waste material from the paint industry. Many paints contain substances that are poisonous and the waste must be treated to avoid dangerous pollution. Other substances are expensive as well and therefore worth recovering, such as heavy metals. The poisonous substances are decomposed in the reactor and the heavy metals are condensed and recovered in the various stages in the distillation unit as first and second distillates etc.

Another example of a base material which is treated not for the primary interest in the end product itself is waste from hospitals. Such waste material is often contaminated with bacteria or other infective substances. In this case the base material can be a mixture of organic and inorganic material.

Still another example of a base material is used rubber, e.g. used tires. The solid material which is separated is suitable for mixing with bitumen in order to be used as road surfacing.

A still further example is mud from rivers or lakes. When treated by the system according to the present invention, the mud can be mixed with humus and soil in order to make a good top-soil free from poisonous substances which often settle on the bottoms of rivers and lakes.

The apparatus is advantageously mounted on a vehicle (not shown) so that it readily can be transported to where the base material is produced. Thus, the high transport costs of moving the cheap base material are eliminated. These costs, prior to the present invention, have been prohibitive.

In summary, the present invention has several advantages over the prior art. The base material is continously fed through the closed, dynamic system, wherein the internal and external parameters of the material and the climate are controlled. The temperature, pressure, dynamic conditions, chemical environment—if necessary by addition of organic or inorganic materials are correctly set. Starting energy is supplied. At the working temperature/pressure the conversion process is effected, periodically in different stages and rates. Generated energy can be reused. Through process control the quantity-quality relation can be set as desired between main and by-products and can be varied by additional substances. The material can also be treated without structural conversion. The primary end product or the base material of the secondary end product is fed into a buffer storage, agitated at slowly decreasing temperature in a determined period and rate. The end stage of the production is the production of the secondary end product through granulation, compression, extrusion, pulverization, moulding, sorting, or any other type of treatment, at a suitable temperature with or without agents added. The packeting is prepared and the finished material is cooled, dried, dusted, sorted, either in situ or during the bulk transport. The material being finished, the material may optionally be directly packeted in a small unity box system for direct delivery without risk of self-reaction and transport damages.

On the basis of vegetable biomass carbon powder, charcoal and other types of high class fuels with predetermined energy content, carbon filter systems, catalysators, etc. are produced. On the basis of animal biomass, additional material for fodder, manure, etc. are produced. General disinfection of biomass with or without additions can be obtained. That is, the system according to the invention can be utilized with the purpose only to disinfect organic material, e.g. infected waste from hospitals. In this case, the end product is of minor interest just as long as it is not dangerous to handle with respect to the risk of infection. General processing of any material, whether organic or inorganic, to convert the structure thereof, add, combine, subtract organic or inorganic material can be achieved.

I claim:

1. An apparatus for refinement and the treatment of gases comprising:
   a gas washing unit;
   a first chamber formed at a bottom portion of the washing unit, a plurality of first nozzles arranged near the top of the first chamber for spraying water therein thereby defining a first washing step for gas entering thereto;
   a second chamber formed at the top portion of the washing unit, in which a plurality of second nozzles are provided for spraying water therein; and
   a plurality of pipes arranged in the second chamber to communicate with the first chamber, each of said pipes having varying cross-sections, and the gas entering the lower end of the pipes;
   wherein the second spraying nozzles are provided over the upper ends of the pipes so that the washing water sprayed from the second nozzles falls down through the pipes and collects the impurities contained in the gas thereby forming a second washing step.

2. An apparatus according to claim 1, wherein a plurality of plates are arranged in the pipes, said plates mixing the washing water and the gas flow increasing the collection of impurities from the gas.

3. An apparatus according to claim 1, further comprising a heat exchanger for cooling and condensing a hot gas before the gas enters the washing unit.

4. An apparatus according to claim 3, further comprising cooling means for indirectly cooling the pipes of the gas washing unit, thereby cooling the gas and the washing water, so that the washing water can be utilized as a cooling fluid in said heat exchanger.

* * * * *